March 5, 1940.   C. P. MOOS   2,192,363
TIRE TESTING MACHINE
Filed Jan. 12, 1939   2 Sheets-Sheet 1

INVENTOR
CHARLES P. MOOS
BY
Chapin + Neal
ATTORNEYS

March 5, 1940.  C. P. MOOS  2,192,363
TIRE TESTING MACHINE
Filed Jan. 12, 1939  2 Sheets-Sheet 2

INVENTOR
CHARLES P. MOOS
BY
Chapin & Neal
ATTORNEYS

Patented Mar. 5, 1940

2,192,363

UNITED STATES PATENT OFFICE 2,192,363

TIRE TESTING MACHINE

Charles P. Moos, South Hadley Falls, Mass., assignor, by mesne assignments, to United States Rubber Company, New York, N. Y., a corporation of New Jersey Application January 12, 1939, Serial No. 250,566

5 Claims. (Cl. 73—51)

My invention relates to tire testing machine and more particularly to a machine for detecting an unbalanced distribution of weight in a pneumatic tire, for indicating the point of overbalance and the degree or amount of overbalance.

It is difficult or impossible to construct a tire so that the material of which the tire is made is distributed uniformly about the tire annulus. Within limits an overbalanced condition is not objectionable, and a degress of overbalance which might otherwise be objectionable can be brought within the harmless range if the valve of the inner tube is placed at the light side of the tire. Thus, it is necessary to test tires for balance and to so mark the tire if within possible limits of overbalance that the person who mounts the tire on its wheel will know where to place the valve stem in order to minimize the unbalanced condition.

It is one object of my invention to provide a machine for the above purposes by means of which the desired determinations may be quickly and accurately made. A further object is to so arrange and construct the parts that maintenance costs are minimized.

Other and further objects residing in the details of the construction will be made apparent in the following specifications and claims.

In the accompanying drawings, which illustrate one embodiment of my invention—

Figure 1:
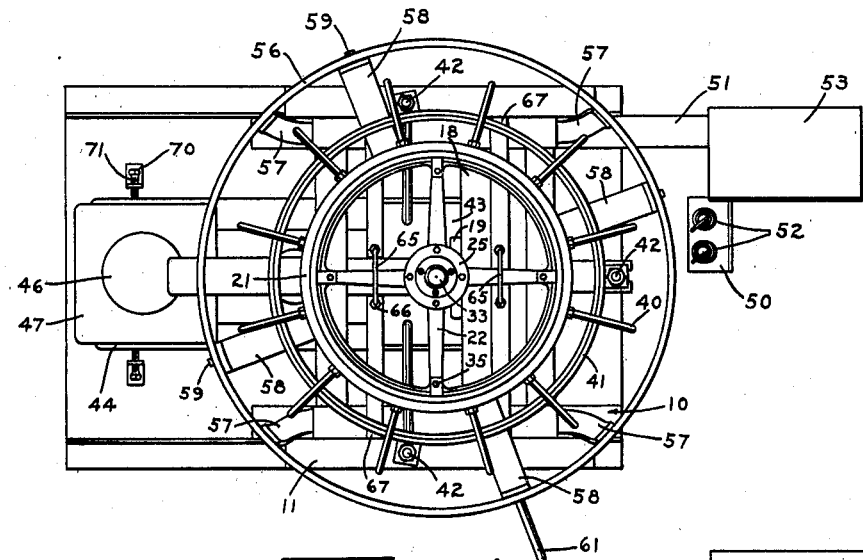
Fig. 1 is a plan view of a testing machine constructed according to my invention.

Referring to the drawings, 10 indicates a generally rectangular frame having front and rear cross pieces 11 which support a transverse member 12. A member 13 provided with a vertical hub 14 is secured to member 12 by bolts 15 centrally of frame 10. A vertical post 16 is threaded in hub 14 and rigidly secured therein as by a nut 17. A cross brace 18 provided with a huge 19 through which post 16 passes prevents lateral movement of the post.

Figure 4:
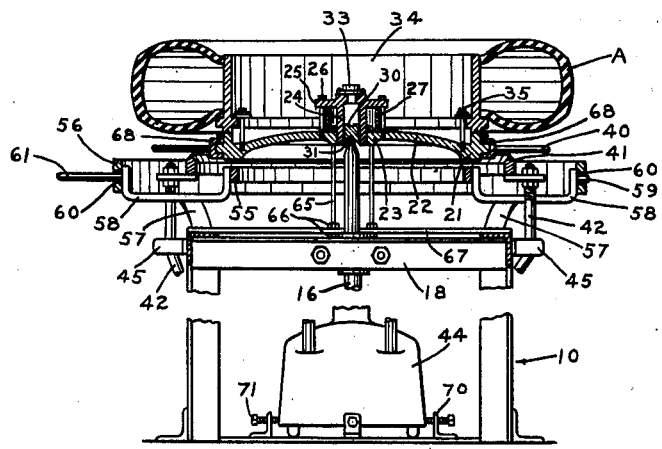
Fig. 4 is a fragmentary view similar to Fig. 3 but partly in section and with parts in section.

The upper end of post 16 is pointed, as shown at 20, to form a pivot point on which a tire carrier is freely supported. The tire carrier includes a wheel-like member comprising a rim portion 21 connected by spokes 22 to a hub portion 23. As best shown in Fig. 4, a cylindrical member 24 provided with a flange 25 is fitted in a central opening in the hub 23 and is held to the hub by bolts 26 passing through flange 25 and threaded into the spokes 22, a spacing collar 27 being positioned between flange 25 and hub 23. A plug 30, threaded in the cylindrical member 24, is provided with a conical seat 31 resting on the pivot point 20. The upper end of cylindrical member 24 is provided with a circular spirit level 33 by which the direction of any tilting of the wheel when the latter rests freely on the point 20 may be determined. A tire receiving rim 34 is secured by bolts 35 to rim 21, and it will be understood that for tires of different sizes rims 34 of suitable diameter will be used.

Rim 21 is provided with a plurality of outwardly extending fingers 40 which extend over a ring 41 which is supported by a plurality of converging rods 42 rigidly secured at their lower ends to the load receiving platform 43 of a weighing scale 44. Rods 42 are guided between members 45 secured to frame 10.

Scale 44 may be of conventional construction and in use a weight 46 is placed on the weight-receiving platform 47 of the scale sufficient to just maintain the fingers 40 out of contact with ring 41 when the carrier rests freely on pivot 20 with a tire, indicated at A, on the carrier. If the material of the tire is not equally distributed around the tire annulus the carrier will tilt in the direction of overweight, causing one or more of the fingers 40 to engage and depress ring 41. The degree of pressure thus exerted on the pan of weighing scale 44 will depend upon the amount of overweight, and this amount may be read or calculated from the reading of the weight indicator 48 of the weighing device. At the same time the bubble of the spirit level 33 will travel toward the high or light side of the tire. In practice the operator, if the weight indication shows the amount of overweight to be within the allowable limit, will place an indication, such as a dot of paint, on the side wall of the tire at the "light" side, as indicated by the bubble of the spirit level. For convenience I provide a shelf 50, supported on a bracket 51 secured to frame 10, on which containers 52 of marking material may be placed. Bracket 51 also supports an inclined table 53, on which report sheets or other similar matter may be placed.

Figure 2:
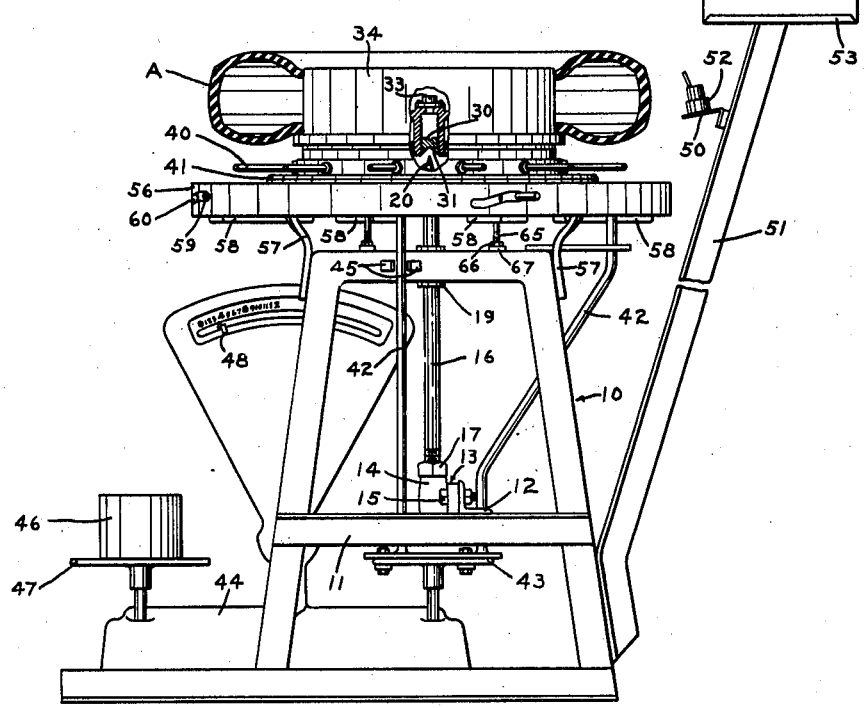
Fig. 2 is a front elevational view of the structure shown in Fig. 1, parts being broken away.
Figure 3:
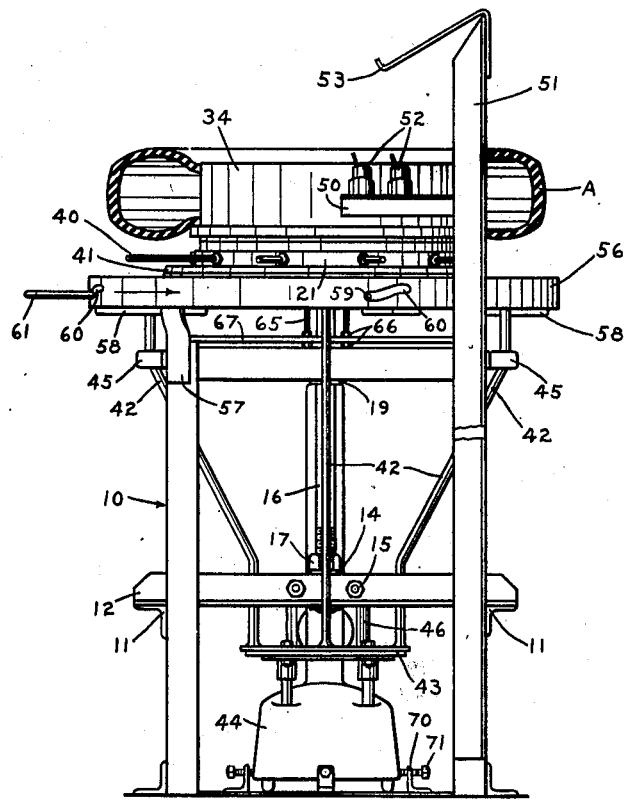
Fig. 3 is a side elevational view looking from the right of Fig. 1.

I provide means for raising the tire carrier from the pivot point and supporting it in that position while a tire is being placed on or removed from rim 34. As shown, this means comprises a ring 55 positioned beneath and concentric with rim 21. Ring 55 is supported from a fixed ring 56, secured to generally vertical supports 57 welded or otherwise secured to the upper portion of the leg members of frame 10, by means of a plurality of radial members 58 secured to the bottom of ring 55 and extending downwardly and outwardly beneath ring 41. The outer ends of members 58 are bent upwardly and provided with pins 59 engaging in inclined cam slots 60 formed in fixed ring 56. One of the pins 59 is extended outwardly of its cam slot as at 61 to form a handle. When pins 59 rest at the lower ends of slots 60, ring 55 is downwardly spaced from rim 21, permitting the carrier to rest freely on pivot 20, as shown in Fig. 4. Rotation of handle 61 in the direction of the arrow in Fig. 3 will cause pins 59 to ride up cam slots 60 as shown in Fig. 2, thus causing ring 55 to contact rim 21 and lift the carrier from the pivot 20 as shown in the latter figure.

To prevent undue rotary movement of the carrier on pivot 20 or its accidental displacement therefrom I preferably provide rods 65, bent into an inverted U-shape, which straddle one or more of the spokes 22 of the carrier, the lower ends of the rods 65 being secured by nuts 66 to bracket members 67 secured to the top of frame 10.

The carrier itself may be balanced in any suitable manner. A plurality of U-shaped weights 68 circumferentially adjustable on the outer periphery of rim 21 are shown for this purpose.

For proper operation it is desirable to accurately maintain ring 41 in concentric relation with the carrier and to secure and maintain this relationship I provide angle brackets 70 in which are threaded screws 71 engaging the sides of the weighing scales to hold the latter in proper position.

By my construction only a very slight degree of movement of the tire carrier on the pivot is necessary and the use of the weighing scale further damps the tendency of the carrier to oscillate on the pivot 20 before coming to rest, so that a reading is quickly secured and the time consumed in the testing operation as a whole is substantially shortened as compared with machines previously used.

I claim:

1. A tire testing machine which comprises a rigid vertical pivot post, a tire carrier, including an annular tire receiving rim, mounted on said pivot post for free tilting movement, a ring member positioned below said tire carrier in substantially coaxial relation with said post and with said tire receiving rim, means extending radially from said carrier in vertically spaced relation with respect to said ring and engaging the latter upon tilting of the carrier with respect to the pivot post, a weighing mechanism, means connecting said ring to the weighing mechanism to cause the latter to indicate the amount of pressure exerted on the ring by the carrier and a level mounted on the carrier to indicate the direction of tilt of the carrier.

2. A tire testing machine which comprises a rigid vertical pivot post, a tire carrier, including a tire receiving rim, mounted on said pivot post for free tilting movement, a ring member positioned below said tire carrier in substantially coaxial relation with said post and with said tire receiving rim, a weighing mechanism supporting said ring free of the post, a plurality of fingers extending from the tire carrier in position to engage the ring upon tilting of the carrier with respect to the post, a level mounted on the carrier for indicating the direction of tilt of the carrier and means to raise said carrier free of the pivot post.

3. A tire testing machine which comprises a rigid vertical pivot post, a tire carrier, including a tire receiving rim, mounted on said pivot post for free tilting movement, a ring member positioned below said tire carrier in substantially coaxial relation with said post and with said tire receiving rim, means extending from said carrier in position to engage the ring upon tilting of the carrier with respect to the post, a weighing means rigidly connected to said ring to indicate the amount of pressure exerted on the ring by the carrier and acting to damp the oscillation of the carrier on the pivot post.

4. A tire testing machine which comprises a rigid vertical pivot post, a tire carrier including a wheel member the hub of which is provided with a conical seat engaging on the upper end of said pivot post to mount the carrier thereon for free tilting movement, a tire receiving rim releasably secured to the rim of said wheel member, a ring member of greater diameter than the wheel member positioned below said wheel member coaxially therewith, weighing mechanism positioned with its load receiving platform in substantially axial alignment with the axis of the wheel and ring member, a plurality of rods connecting said ring member rigidly to the loading platform of the weighing mechanism, a plurality of fingers extending outwardly from the rim of the wheel member and beyond the ring member for engagement with the latter upon tilting of the carrier with respect to the post, a level mounted on the hub of the wheel member for indicating the direction of tilt of the carrier, and means supported independently of both the post and ring for raising the carrier free of the pivot post.

5. A tire testing machine which comprises a rigid vertical pivot post, a tire carrier, including a tire receiving rim, mounted on said pivot post for free tilting movement, a ring member positioned in substantially coaxial relation with said post and with said tire receiving rim, means extending from said carrier in position to engage the ring upon tilting of the carrier with respect to the post, and a weighing means connected to said ring to indicate the amount of pressure exerted on the ring by the carrier.

CHARLES P. MOOS.